United States Patent
Cho et al.

(10) Patent No.: US 10,797,303 B2
(45) Date of Patent: Oct. 6, 2020

(54) SILICON-BASED ANODE ACTIVE MATERIAL AND PREPARATION METHOD THEREFOR

(71) Applicant: Nexeon Ltd, Oxfordshire (GB)

(72) Inventors: Young Tai Cho, Seoul (KR); Yong Gil Choi, Daejeon (KR); Seung Chul Park, Daejeon (KR); Seon Park, Daejeon (KR); Hee Young Seo, Daejeon (KR); Jee Hye Park, Daejeon (KR); Yong Eui Lee, Gyeonggi-do (KR); Chul Hwan Kim, Daejeon (KR)

(73) Assignee: Nexeon Ltd, Oxfordshire (GB)

( * ) Notice: Subject to any disclaimer, the term of this patent is extended or adjusted under 35 U.S.C. 154(b) by 200 days.

(21) Appl. No.: 15/561,171

(22) PCT Filed: Mar. 25, 2016

(86) PCT No.: PCT/KR2016/003088
§ 371 (c)(1),
(2) Date: Sep. 25, 2017

(87) PCT Pub. No.: WO2016/153322
PCT Pub. Date: Sep. 29, 2016

(65) Prior Publication Data
US 2018/0083263 A1    Mar. 22, 2018

(30) Foreign Application Priority Data
Mar. 26, 2015   (KR) .................. 10-2015-0042579

(51) Int. Cl.
*H01M 4/134*    (2010.01)
*H01M 4/58*     (2010.01)
(Continued)

(52) U.S. Cl.
CPC .......... *H01M 4/134* (2013.01); *H01M 4/386* (2013.01); *H01M 4/58* (2013.01); *H01M 4/5805* (2013.01);
(Continued)

(58) Field of Classification Search
None
See application file for complete search history.

(56) References Cited

U.S. PATENT DOCUMENTS 8,945,431 B2   2/2015   Schulz et al.
8,986,577 B2   3/2015   Kang et al.
(Continued)

FOREIGN PATENT DOCUMENTS

EP   2873646 A1   5/2015
EP   2533331 B1   8/2015
(Continued)

OTHER PUBLICATIONS

Abel, P. R. et al., Improving the Stability of Nanostructured Silicon Thin Film Lithium-Ion Battery Anodes through Their Controlled Oxidation, ACS Nano, 6(3):2506-2516, (2012).
(Continued)

*Primary Examiner* — Wyatt P McConnell
(74) *Attorney, Agent, or Firm* — William R. Haulbrook; Michael D. Schmitt; Choate, Hall & Stewart LLP (57) ABSTRACT

The present invention relates to a silicon-based anode active material and a method of fabricating the same. The silicon-based anode active material according to an embodiment of the present invention comprises: particles comprising silicon and oxygen combined with the silicon, wherein a carbon-based conductive layer is coated with on outermost surface of the particles; and phosphorus doped in the particles, wherein a content of the phosphorus with respect to a total weight of the particles and the phosphorus doped in the
(Continued)

particles have a range of 0.01 wt % to 15 wt %, and a content of the oxygen has a range of 9.5 wt % to 25 wt %.

6 Claims, 5 Drawing Sheets

(51) Int. Cl.
H01M 4/38 (2006.01)
H01M 4/62 (2006.01)
H01M 10/052 (2010.01)
H01M 4/02 (2006.01)

(52) U.S. Cl.
CPC ......... *H01M 4/622* (2013.01); *H01M 4/625* (2013.01); *H01M 10/052* (2013.01); *H01M 2004/027* (2013.01)

(56) References Cited

U.S. PATENT DOCUMENTS

| | | |
|---|---|---|
| 9,461,304 B2 | 10/2016 | Newbound et al. |
| 9,548,489 B2 | 1/2017 | Abdelsalam et al. |
| 10,008,716 B2 | 6/2018 | Abdelsalam et al. |
| 10,077,506 B2 | 9/2018 | Friend et al. |
| 10,090,513 B2 | 10/2018 | Canham et al. |
| 10,103,379 B2 | 10/2018 | Macklin et al. |
| 10,388,948 B2 | 8/2019 | Abdelsalam et al. |
| 10,396,355 B2 | 8/2019 | Cho et al. |
| 10,673,072 B2 | 6/2020 | Cho et al. |
| 10,693,134 B2 | 6/2020 | Cho et al. |
| 2003/0157407 A1 | 8/2003 | Kosuzu et al. |
| 2003/0215711 A1 | 11/2003 | Aramata et al. |
| 2004/0052867 A1 | 3/2004 | Canham |
| 2004/0166319 A1 | 8/2004 | Li et al. |
| 2004/0185341 A1 | 9/2004 | Yamamoto et al. |
| 2005/0031958 A1 | 2/2005 | Fukuoka et al. |
| 2005/0233213 A1 | 10/2005 | Lee et al. |
| 2006/0099495 A1 | 5/2006 | Suzuki et al. |
| 2006/0102473 A1 | 5/2006 | Bito et al. |
| 2006/0251561 A1 | 11/2006 | Farrell et al. |
| 2007/0077490 A1 | 4/2007 | Kim et al. |
| 2007/0281216 A1 | 12/2007 | Petrat et al. |
| 2008/0096110 A1 | 4/2008 | Bito et al. |
| 2008/0124631 A1 | 5/2008 | Fukui et al. |
| 2009/0004568 A1 | 1/2009 | Hirose et al. |
| 2009/0010833 A1 | 1/2009 | Rosenband et al. |
| 2009/0029256 A1 | 1/2009 | Mah et al. |
| 2009/0162750 A1 | 6/2009 | Kawakami et al. |
| 2009/0169985 A1 | 7/2009 | Yamaguchi et al. |
| 2010/0009261 A1 | 1/2010 | Watanabe |
| 2010/0143798 A1 | 6/2010 | Zhamu et al. |
| 2011/0067228 A1 | 3/2011 | Green |
| 2011/0256452 A1 | 10/2011 | Cho et al. |
| 2012/0100438 A1 | 4/2012 | Fasching et al. |
| 2012/0244438 A1* | 9/2012 | Kerlau .................. H01M 4/134 429/213 |
| 2013/0040199 A1 | 2/2013 | Yamamura |
| 2013/0224583 A1 | 8/2013 | Green |
| 2013/0337314 A1 | 12/2013 | Essaki et al. |
| 2014/0021415 A1 | 1/2014 | Kang et al. |
| 2014/0050987 A1* | 2/2014 | Park ...................... H01M 4/366 429/231.8 |
| 2014/0162131 A1 | 6/2014 | Friend et al. |
| 2014/0170303 A1 | 6/2014 | Rayner et al. |
| 2014/0349183 A1 | 11/2014 | Macklin et al. |
| 2014/0349187 A1 | 11/2014 | Hirose et al. |
| 2015/0037673 A1 | 2/2015 | Zaghib et al. |
| 2015/0044571 A1 | 2/2015 | Abdelsalam et al. |
| 2015/0072240 A1 | 3/2015 | Yoo et al. |
| 2015/0086870 A1 | 3/2015 | Fukasawa et al. |
| 2015/0104705 A1 | 4/2015 | Canham et al. |
| 2015/0221936 A1 | 8/2015 | Huang |
| 2015/0263342 A1 | 9/2015 | Newbound et al. |
| 2015/0280221 A1 | 10/2015 | Abdelsalam et al. |
| 2015/0380735 A1 | 12/2015 | Tuduki et al. |
| 2016/0172670 A1 | 6/2016 | Friend |
| 2017/0033357 A1 | 2/2017 | Cho et al. |
| 2017/0047580 A1 | 2/2017 | Cho et al. |
| 2017/0214042 A1 | 7/2017 | Cho et al. |
| 2017/0352883 A1 | 12/2017 | Cho et al. |
| 2018/0034056 A1 | 2/2018 | Cho et al. |
| 2018/0069234 A1 | 3/2018 | Friend et al. |
| 2019/0119826 A1 | 4/2019 | Friend et al. |
| 2019/0148718 A1 | 5/2019 | Hatazawa et al. |
| 2019/0190020 A1 | 6/2019 | Park et al. |
| 2019/0198869 A1 | 6/2019 | Park et al. |

FOREIGN PATENT DOCUMENTS

| | | |
|---|---|---|
| JP | 2000-243395 A | 9/2000 |
| JP | 2004-303593 A | 10/2004 |
| JP | 2004-311429 A | 11/2004 |
| JP | 2005-259697 | 9/2005 |
| JP | 2008-277231 A | 11/2008 |
| JP | 2010-011100 | 1/2010 |
| JP | 2010-218848 | 9/2010 |
| JP | 2011/198614 A | 10/2011 |
| JP | 5603018 B2 | 10/2014 |
| KR | 10-1341951 | 12/2013 |
| WO | WO-2015/003996 A1 | 1/2015 |
| WO | WO-2016/102098 A1 | 6/2016 |
| WO | WO-2016/102208 A1 | 6/2016 |
| WO | WO-2016/174023 A1 | 11/2016 |

OTHER PUBLICATIONS

Cui, et al. Doping and Electrical Transport in Silicon Nanowires, Journal of Physical Chemistry, 104(22):5213-5216, (2000).
Gao et al., Alloy formation in Nanostructured Silicon, Journal of Advanced Materials, 13(11):816-819, (2001).
Graetz, J. et al., Highly reversible lithium storage in nanostructured silicon, Journal of the Electrochemical Society, 6(9):194-197, (2003).
Jia et al., Novel Three-Dimensional Mesoporous Silicon for High Power Litium-Ion Battery Anode Material, Advs. Energy Mater., 1:1036-1039, (2011).
Jia et al., Supporting Information for Advs. Energy Mater., DOI: 10.1002/aenm.201100485: Novel Three-Dimensional Mesoporous Silicon for High Power Lithium-Ion Battery Anode Material, Advanced Energy Materials, DOI: 10.1002/aenm.201100485, 4 pages, (2011).
Jung, S. C. et al., Anisotropic Volume Expansion of Crystalline Silicon during Electrochemical Lithium Insertion: An Atomic Level Rationale, Nano Letters, 12:5342-5347, (2012).
Li, H. et al., The crystal structural evolution of nano-Si anode caused by lithium insertion and extraction at room temperature, Solid State Ionics 135:181-191, (2000).
Ren, W. et al., Preparation of porous silicon/carbon microspheres as high performance anode materials for lithium ion batteries, Journal of Materials Chemistry A: Materials for Energy and Sustainability, 3(11):5859-5865, (2015).
Van Schalkwijk, Walter A. and Scrosati, Bruno, Advances in Lithium-Ion Batteries (edited 2002 Excerpts).
Wachtler, M. et al., Anodic materials for rechargeable Li-batteries, Journal of Power Sources 105:151-160, (2002).
Winter, M. et al., Insertion Electrode Materials for Rechargeable Lithium Batteries, Adv. Mater. 10(10):725-763, (1988).
International Search Report dated Aug. 8, 2016 for PCT/KR2016/003088.
Su, L. et al., "Core Double-Shell Si@SiO$_2$@C Nanocomposites as Anode Materials for Li-ion Batteries", Chemical Communications: Chem. Comm., 2010, vol. 46, No. 15, pp. 2590-2592.

* cited by examiner

SILICON-BASED ANODE ACTIVE MATERIAL AND PREPARATION METHOD THEREFOR

This application claims the priority of Korean Patent Application No. 10-2015-0042579, filed on Mar. 26, 2015 in the KIPO (Korean Intellectual Property Office), the disclosure of which is incorporated herein entirely by reference. Further, this application is the National Stage application of International Application No. PCT/KR2016/003088, filed Mar. 25, 2016, which designates the United States and was published in Korean. Each of these applications is hereby incorporated by reference in their entirety into the present application.

TECHNICAL FIELD

The present invention relates to a secondary battery technology, and more particularly, to a silicon-based anode active material for a secondary battery and a method of fabricating the same.

BACKGROUND ART

A secondary battery is a battery that may be charged and discharged by using an electrode material having excellent reversibility. Typically, lithium secondary batteries have been commercialized. The lithium secondary battery can be used not only as a small power source for small IT devices such as a smart phone, a portable computer, and an electronic paper, but also as a medium and large power source which are mounted on a moving means such as an automobile or used for power storage of a power supply network such as a smart grid.

When a lithium-based metal is used as an anode material for a lithium secondary battery, the lithium secondary battery may short-circuited or explode due to formation of dendrites. Therefore, a carbon-based active material to and from which lithium may be intercalated or de-intercalated, such as crystalline carbon including graphite and artificial graphite having a theoretical capacity of 372 mAh/g, soft carbon, or hard carbon, is commonly used for an anode instead of the lithium-based metal. However, as the range of application of secondary batteries expands, there are further demand for higher capacity and higher output of secondary batteries. Therefore, non-carbon-based anode materials that may be alloyed with lithium and have sufficient capacities (500 mAh/g or larger) for replacing carbon-based anode materials, such as silicon (Si), tin (Sn), or aluminum (Al), are being spotlighted.

Among the non-carbon anode materials, silicon has a theoretical capacity of about 4,200 mAh/g, which is important in the application of a high capacity battery in terms of capacity. However, since the volume of the silicon expands by about four times during charging, the electrical connection between the active materials is broken due to the volume change during charge/discharge, the active material is separated from the current collector, and the solid There is a barrier to the practical use thereof due to the progress of the irreversible reaction such as the formation of a solid electrolyte interface (SEI) layer and the deterioration of the service life due to this.

Although many suggestions have been made for realizing a relatively high capacity battery while improving service time thereof by minimizing the volume expansion and contraction of an active material, the most commercially promising suggestion is a $SiO_x$-based composite active material in which nano Si is dispersed. However, although a material containing $SiO_x$ may improve service lift by suppressing volume expansion, the material containing $SiO_x$ have limits including reduced capacity and deteriorated charge/discharge efficiency as compared to a material containing pure silicon. Therefore, for application of a silicon-based material, it is necessary to ensure sufficient service life by suppressing volume changes during charging and discharging and prevent capacity reduction and deterioration of charging/discharging efficiency simultaneously.

DISCLOSURE OF THE INVENTION

Technical Problem

The present invention provides a silicon-based anode active material that employs silicon for improved service life and exhibit high capacity, high charging/discharging efficiency and excellent rate performance of battery simultaneously.

The present invention also provides a method of economically and quickly mass-producing a silicon-based anode active material having the above-stated advantages.

Technical Solution

According to an aspect of the present invention, there is provided a silicon based anode active material including particles comprising silicon and oxygen combined with the silicon, wherein a carbon-based conductive layer is coated with on outermost surface of the particles; and phosphorus doped in the particles. In this case, wherein a content of the phosphorus with respect to a total weight of the particles and the phosphorus doped in the particles have a range from 0.01 wt % to 15 wt %, and a content of the oxygen has a range from 9.5 wt % to 25 wt %. Preferably, the content of the phosphorus with respect to the total weight of the particles and the phosphorus doped in the particles have a range of 0.01 wt % to 5 wt %. The silicon based anode active material of claim 1, wherein a content of the carbon-based conductive layer with respect to the total weight of the particles and the phosphorus doped in the particles have a range from 4.5 wt % to 32 wt %.

According to an embodiment, wherein the particles comprise a core of the silicon, a shell of silicon oxide on the core of the silicon, and the carbon-based conductive layer on the shell. At least a part of the shell of the silicon oxide comprises phosphorous silicate. The silicon-based anode active material of claim 5, wherein a thickness of the phosphorous silicate have a range from 3 nm to 15 nm. Furthermore, the phosphorus is doped in the core of the silicon.

According to another aspect of the present invention, there is provided a method of fabricating a silicon based anode active material, the method comprising: providing first particles of silicon as a starting material; providing a solvent comprising water, oxygen-containing liquid hydrocarbon materials or a mixture thereof for an oxidation of the first particles of silicon; adding the first particles of the silicon into the solvent to form a mixed solution; obtaining slurries of the first particles of the silicon from the mixed solution; forming intermediate particles comprising a core of the silicon and a shell of a silicon oxide surrounding the core of the silicon, by chemically oxidizing of surfaces of the first particles of the silicon, by pulverizing or polishing the slurries; providing a phosphorus-containing compound as a phosphorus precursor for doping phosphorus; forming second particles of silicon including the intermediate particles coated with the phosphorus-containing compound; and performing heat treatment on the second particles of the silicon to diffuse phosphorus into the second particles of the silicon.

According to an embodiment, the method may further include forming a conductive layer on the second particles of the silicon before or after the heat treatment. The oxygen-containing liquid hydrocarbon materials comprises any one or a mixture of two or more of methanol, ethanol, isopropyl alcohol (IPA), and hydrogen peroxide ($H_2O_2$). The phosphorus-containing compound comprises $H_2PO_4$ (phosphoric acid) or $P_2O_5$. The heat treatment is performed within a temperature range from 600° C. to 1,100° C.

According to another aspect of the present invention, there is provided a method of fabricating a silicon based negative electrode, the method comprising: providing first particles of silicon as a starting material; forming intermediate particles comprising silicon and silicon oxide by oxidizing the first particle of the silicon; coating a phosphorus sacrificing layer on the intermediate particles; and performing heat treatment on the intermediate particles coated with the phosphorus sacrificing layer to diffuse phosphorus into the intermediate particles. In this case, the method may further include forming a conductive layer on the intermediate particles before or after the heat treatment.

According to an embodiment, the phosphorus sacrificial layer comprises one or more solid phosphorus precursor selected from the group consisting of $H_2PO_4$ (phosphorous acid), $P_2O_5$, $H_4P_2O_7$, and $HPO_3$. The heat treatment is performed within a temperature range from 600° C. to 1,100° C.

Advantageous Effects

According to an embodiment of the present invention, there is provided a silicon-based anode active material having particles, which include silicon and a silicon oxide formed by at least partially oxidizing silicon and are coated with carbon-based conductive layers, thereby improving service life by suppressing volume expansion of silicon due to charging and discharging and exhibiting high capacity retention and excellent rate performance of battery by improving charging/discharging efficiency by doping phosphorus in the particles.

Furthermore, according to embodiments of the present invention, there is provided a method of economically mass-producing a silicon-based anode active material a silicon-based anode active material having the above-stated advantages by doping phosphorus via a heat treatment using a liquid phosphorus precursor or a solid phosphorus precursor.

MODE FOR CARRYING OUT THE INVENTION

The present invention will now be described more fully with reference to the accompanying drawings, in which exemplary embodiments of the invention are shown.

The invention may, however, be embodied in many different forms and should not be construed as being limited to the embodiments set forth herein; rather these embodiments are provided so that this disclosure will be thorough and complete, and will fully convey the concept of the invention to one of ordinary skill in the art. Meanwhile, the terminology used herein is for the purpose of describing particular embodiments only and is not intended to be limiting of exemplary embodiments.

Also, thickness or sizes of layers in the drawings are exaggerated for convenience of explanation and clarity, and the same reference numerals denote the same elements in the drawings. As used herein, the term "and/or" includes any and all combinations of one or more of the associated listed items.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

Figure 1A:
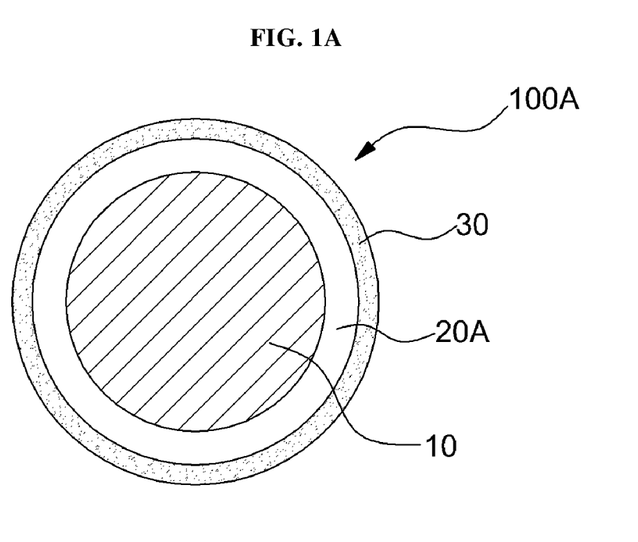
FIGS. 1A and 1B are cross-sectional views of silicon-based anode active materials according to various embodiments of the present invention, respectively.
Figure 1B:
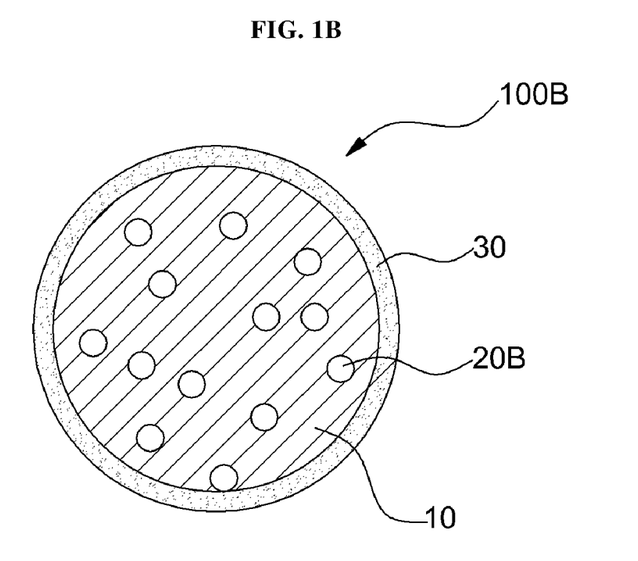

FIGS. 1A and 1B are cross-sectional views of silicon-based anode active materials 100A and 100B according to various embodiments of the present invention, respectively.

Referring to FIGS. 1A and 1B, the silicon-based anode active materials 100A and 100B have a particle structure. The silicon-based anode active material 100A of FIG. 1A may include a core 10 of silicon and a shell 20A of silicon oxide surrounding the core 10. In other embodiments, as shown in FIG. 1B, the silicon-based anode active material 100B may include a matrix 10 of silicon and a silicon oxide 20B dispersed in the matrix 10. The content of oxygen with respect to a total weight of the silicon-based anode active material is within the range from 9.5 weight % (or wt %) to 25 weight %. When the content of oxygen is less than 9.5 weight %, the volume expansion suppressing force of the silicon-based anode active material is insufficient, and thus capacity retention and service life are deteriorated. When the content of oxygen is more than 25 weight %, the charge and discharge capacities of the silicon-based anode active material are rapidly reduced.

The core 10 of silicon and the matrix 10 of silicon may be first particles, but the first particles may be second particles that are formed as the first particles are aggregated. The silicon-based anode active materials 100A and 100B may further include a carbon-based conductive layer 30 at the outermost layer. The carbon-based conductive layer 30 is for electrical connection between the silicon-based anode active materials 100A and 100B contacting each other, and reduces the internal resistance to the current collector (not shown). The carbon-based conductive layer 30 is a layer for electrical interconnection between the silicon-based anode active materials 100A and 100B contacting each other and reduces the internal resistance to a current collector (not shown). The carbon-based conductive layer 30 may include a graphite, a soft carbon, a graphene, an amorphous carbon film, or at least a partially-crystalline carbon film. Since the amorphous or low-crystalline carbon film is chemically resistant to an electrolyte, decomposition of the electrolyte is suppressed at the time of charging and discharging, and thus the service life of an anode may be improved. Furthermore, the carbon-based conductive layer 30 may include a mixed structure including an electroconductive graphite structure SP2 and an insulating diamond structure SP3. In order for the carbon-based conductive layer 30 to have conductivity, the SP2 may have a larger mole fraction than the SP3, where the mole fraction may be controlled through a heat treatment process.

The average particle size of the silicon-based anode active materials 100A and 100B having the particle structure may be within a range from 10 nm to 10 μm, but the present invention is not limited thereto. Phosphorus is doped in the silicon based anode active materials 100A and 100B having the particle structure. In one embodiment, the content of phosphorus with respect to a total weight of the silicon based anode active material 100A and 100B of the particle structure may be from 0.01 wt % to 15 wt %. When the content of phosphorus is less than 0.01 weight %, a capacity to weight ratio and a rate performance of battery may be degraded. When the content of phosphorus is more than 15 weight %, %, the capacity to weight ratio may be also degraded and this may be caused by a decrease in the content of silicon due to the content of an excessive phosphorus.

Doped phosphorus may penetrate into silicon and be doped therein or may be combined with a silicon oxide and form phosphorous-silicate. Phosphorus penetrated into the silicon can improve the conductivity of the silicon and minimizes reduction of the magnitude of potential size from surfaces to the interior of the silicon-based anode active materials 100A and 100B, thereby maintaining sufficient potential for reduction or oxidation of lithium throughout an active material layer. As a result, the initial charge capacity and charge/discharge efficiency may be improved and capacity reduced due to silicon oxide for volume expansion suppression may be compensated for. Furthermore, the shell 20A of the phospho-silicate that is phosphorated in a core-shell structure, such as a silicon-based anode active material 100A, forms a stronger glass layer than a silicon oxide, thereby preventing decomposition of a silicon-based anode active material due to erosion of an electrode. As a result, the life-span deterioration is reduced and the rate performance are improved by having electrical conductivity and ionic conductivity.

A thickness of the shell 20A of the phosphorous silicate may be within the range from 3 nm to 15 nm. When the thickness of the shell 20A of the phosphorus silicate is less than 3 nm, suppression of volume expansion and formation of a SEI layer are not effective. When the thickness of the phosphorus silicate is more than 15 nm, the shell 20A of the phospho-silicate may rather function as a barrier layer against intercalation and deintercalation of lithium, thereby causing decreases in a charging rate and a charging speed. A very thin continuous or non-continuous silicon carbide layer (SiC) may also be formed between the shell 20A of the phospho-silicate and the carbon-based conductive layer 30, which is a conductive layer.

As described above, the phosphorus doped in the silicon-based anode active materials 100A and 100B improves the initial charging rates of the silicon-based anode active materials 100A and 100B, thereby resolving capacity reduction of a silicon-based anode active material due to content of oxygen introduced for reducing volume expansion. As a result, a high capacity silicon-based active material with long service life may be provided. Although it is supposed that the improvement of the initial charging rate by phosphorus is due to improvement of the conductivity of intrinsic silicon, the present invention is not limited by such a theoretical explanation.

As described above, when the content of oxygen related to the total weight of a silicon-based anode active material is maintained within the range from 9.5 weight % to 25 weight % and the content of phosphorus is within the range from 0.01 weight % to 15 weight %, a silicon-based anode active material that are suitable for commercialization and has long service life by exhibiting the capacity per weight of 1,500 mAh/g, improved capacity retention based on suppression of volume expansion, and initial charging/discharging rates equal to or above 85% may be provided.

The content of phosphorus was determined by dissolving a sample in aqua regia (nitric acid:hydrochloric acid=1:3) and quantifying the content of phosphorus present in the sample by using an inductively coupled plasma spectrometer (ICP-AES).

The content of oxygen is measured according to an infrared ray detection method using a commercial element analyzer (ELTRA ONH-2000). Specifically, the amount of oxygen is quantified by changing the amount of oxygen present in a sample to carbon dioxide and measuring the amount of generated carbon dioxide by using the sample of 2 mg to 10 mg, a heat amount of 8 kW, and a carrier gas of helium (99.995% pure).

The amount of carbon may be measured according to an infrared detection method by measuring the amount of $CO_2$ obtained by burning carbon using a commercial carbon analyzer (c/s meter). Finally, the content of silicon may be evaluated based on a residual amount excluding the measured content of oxygen, boron, and carbon in the total weight of particles.

Figure 2:
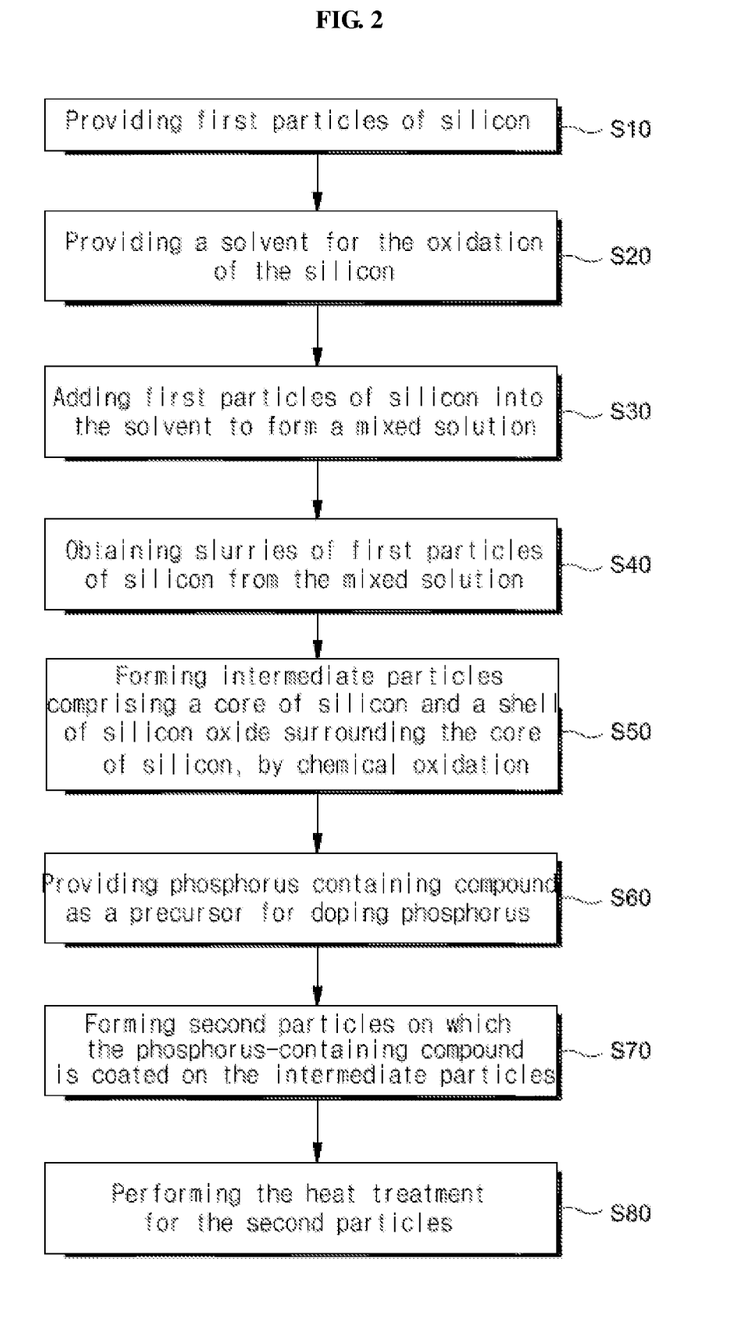
FIG. 2 is a flowchart showing a method of manufacturing a silicon-based anode active material according to an embodiment of the present invention.

FIG. 2 is a flowchart showing a method of fabricating a silicon-based anode active material according to an embodiment of the present invention.

Referring to FIG. 2, first particles of silicon as a starting material is provided (operation S10). The first particles of silicon may be a polysilicon or a monocrystalline silicon coarse particle, and may even be amorphous with low crystallinity. Alternatively, the particles of silicon may be prepared by making the coarse particles into nanoparticles through a pulverizing process or a polishing process or through electrical explosion of a large-volume silicon material, e.g., a silicon rod or a wafer. The particles of silicon may preferably have an average particle diameter within a range from 20 nm to 300 nm, such that a silicon-based anode active material formed through a formation of a silicon oxide described below may has an average particle diameter within a range from 10 nm to 10 μm.

For oxidation of the first particles of silicon, a solvent including water, an oxygen-containing liquid hydrocarbon, or a mixture thereof is provided (operation S20). The oxygen-containing liquid hydrocarbon material may include a mixed solvent of any one or more of methanol, ethanol, isopropyl alcohol (IPA), and hydrogen peroxide ($H_2O_2$). Preferably, the solvent may be water or methanol. The methanol is a hydrocarbon substance having the largest oxygen-to-carbon content and suppresses the carbon content compared with other hydrocarbon substances, thus being advantageous for forming a silicon-based anode active material composite including a core of silicon and a shell of silicon oxide formed on the core. Actually, other hydrocarbon substances may interfere formation of a silicon oxide on a core of silicon, requires a separate heat treatment for removing carbon to form a silicon oxide, and densely forms $SiO_2$ that deteriorates the initial charging/discharging efficiency due to thermal oxidation.

Next, the first particles of silicon are added to the solvent and the solvent is stirred to form a mixed solution (operation S30). Slurries of the first particles of silicon are obtained from the mixed solution (operation S40).

Simultaneously with a pulverizing operation or a polishing operation regarding the slurries, the surfaces of the first particles of silicon are chemically oxidized by at least one of compression stress or shearing stress induced on the surfaces of the first particles of silicon during the pulverizing operation or the polishing operation, and thus intermediate particles including core of silicon and shell of silicon oxide surrounding the core of silicon are formed (operation S50). The compression stress and the shearing stresses for forming the intermediate particles may be controlled based on at least one of the rotation speed, the rotation time, and the pressure of a milling operation.

A phosphorus-containing compound, which is a phosphorus precursor for doping phosphorus, is provided (operation S60). According to an embodiment, the phosphorus-containing compound may include $H_2PO_4$ (phosphoric acid) or $P_2O_5$. The phosphorus-containing compound and the intermediate particles are mixed to form a mixture. The mixture may also be provided by coating the surfaces of the intermediate particles with a liquid boron-containing compound or forming a mixed solution by adding the intermediate particles and the phosphorus-containing compound to a solvent as described above, such as water or ethanol. The mixture may be dried to form second particles of silicon coated with the phosphorus-containing compound (operation S70).

Next, heat treatment is performed with respect to the second particles of silicon, thereby allowing phosphorus to diffuse into the second particles of silicon (operation S80). The heat treatment may be performed at a temperature within a range from 600° C. to 1,100° C. The heat treatment may be performed by using an inert gas, such as argon or helium, but the present invention is not limited thereto. For example, the heat treatment may be performed in an oxidizing atmosphere using oxygen or ozone or in a reducing atmosphere using hydrogen or nitrogen gas. During the heat treatment, phosphorus may react with shells of the silicon oxide and form phosphorus silicate layer. Furthermore, phosphorus may be diffused into cores of the silicon through shells of the silicon oxide and doped in cores of the silicon. If necessary, an operation for re-disintegrating the heat-treated particles may be performed.

Next, an operation for forming a carbon-based conductive layer on the silicon-based anode active material 100A may be further performed. According to another embodiment, an operation for forming the carbon-based conductive layer may be performed prior to the heat treatment for doping phosphorus.

The carbon-based conductive layer may be formed by preparing a solution having dispersed therein a conductive material which is a precursor with a binder, in a suitable solvent, dispersing the silicon-based anode active material in the solution, and drying the silicon-based anode active material. As a result, the carbon-based conductive layer may be provided. According to another embodiment, the carbon-based conductive layer may be obtained by dissolving a polymer precursor material, such as polyacrylonitrile (PAN), polyethylene (PE), polyacrylic acid (PAA), or polyvinylpyrrolidone (PVP), in a suitable solvent, dispersing silicon-based anode active material therein, obtaining intermediate particles that are wetted with the polymer precursor material, and drying and thermally treating the intermediate particles. As a result, the silicon-based anode active material 100A shown in FIG. 1A may be manufactured.

Figure 3:
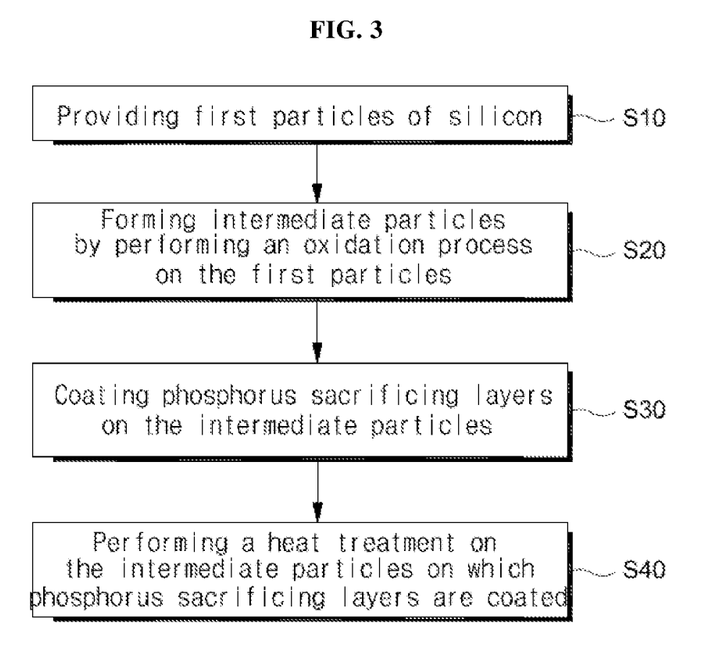
FIG. 3 is a flowchart showing a method of manufacturing a silicon-based anode active material according to another embodiment of the present invention.

FIG. 3 is a flowchart showing a method of fabricating a silicon-based anode active material according to another embodiment of the present invention.

Referring to FIG. 3, first particles of silicon as a starting material are provided (operation S10). Next, an oxidization operation for binding oxygen to the first particles of silicon is performed to produce intermediate particles containing silicon and a silicon oxide (operation S20). The oxidation operation may be achieved by chemically oxidizing the first particles of silicon in an oxygen-containing liquid solvent. The oxygen-containing liquid solvent may be water, methanol, ethanol, isopropyl alcohol (IPA), hydrogen peroxide ($H_2O_2$), or a mixture of two or more thereof and may preferably be water or methanol. In this case, intermediate particles including cores of silicon and shells of silicon dioxide formed on the cores of the silicon may be produced.

According to another embodiment, the oxidation operation may be performed through an oxygen ion implantation operation. The first particles of silicon become a silicon matrix, and intermediate particles including a silicon oxide in which the ion-implanted oxygen is dispersed in the silicon matrix may be provided. Ion implantation energy and density for the ion implantation are controlled, such that the oxygen content with respect to the total weight of the produced silicon-based anode active material is limited to from 16 weight % to 29 weight %. While avoiding thermal oxidation of silicon, a heat treatment may be additionally performed at a low temperature from 50° C. to 200° C. for the bonding between silicon matrix and injected oxygen.

According to yet another embodiment, the first particles of silicon may be chemically oxidized by at least one of compression stress and shearing stress simultaneously induced as an operation for pulverizing or polishing coarse particles of silicon is performed. For example, when slurries of particles of silicon are prepared by using the above-stated oxygen-containing liquid solvent and the slurries are subjected to a pulverizing and polishing operation through a milling operation, particles become fine and sensitivity of stress increases, thereby facilitating the chemical oxidation of the first particles of silicon. In this case, intermediate particles including cores of silicon and shells of silicon dioxide formed on cores of the silicon may be produced/

Next, phosphorus sacrificing layers are formed on the intermediate particles (operation S30). The phosphorus sacrificing layer may include a solid phosphorus precursor, which is any one or a mixture of two or more of $H_2PO_4$ (phosphoric acid), $P_2O_5$, $H_4P_2O_7$ and $HPO_3$. The formation of the phosphorus sacrificing layers may be achieved by coating the phosphorus precursor on the intermediate particles by using a suitable solvent.

Next, a phosphorous-doped silicon-based anode active material may be manufactured by performing a heat treatment on the intermediate particles having formed thereon the phosphorous sacrificing layer (operation S40). The heat treatment may be performed within a range from 600° C. to 1,100° C. During the heat treatment, the phosphorous sacrificing layer is decomposed, and thus phosphorous diffuses into the silicon and may react with silicon oxide to form phosphorus silicate. Next, an additional pulverizing operation may be performed to atomize the heat-treated silicon-based anode active material. Furthermore, an operation for forming a conductive layer on the silicon-based anode active material 100B may be further performed. The above-stated operation may be referred to for the formation of the conductive layer. As a result, the silicon-based anode active material 100B shown in FIG. 1B may be provided.

Hereinafter, embodiments of the present invention will be described in more details with reference to experimental examples. Specific values of the experimental examples below are merely examples, and it should be clearly understood that the present invention is not limited thereto.

Experimental Examples and Comparative Experimental Example

After silicon powder (average particle size was 5 μm and 99.9% pure) was dispersed in methanol, the resultant was subjected to pulverization-dispersion to nanoparticles having particle sizes within the range from 10 nm to 300 nm by using a nano pulverization-disperser (KM-5L), and a silicon oxide was formed through stirring and circulation.

Phosphoric acid (99.9%) was added to the dispersion liquid containing the wet oxidized silicon particles, dissolved, and dried, thereby coating the surface of the silicon particles with phosphoric acid. The coated silicon particles were treated in argon (Ar) gas atmosphere at about 900° C. for about 3 hours to induce diffusion of boron into the silicon-based particles.

The polyvinylpyrrolidone (PVP) was coated on the silicon particles that have been subjected to the phosphating and the coated silicon particles were treated in argon (Ar) gas atmosphere at about 900° C. for about 3 hours. As a result, a silicon-based anode active material having a core-shell structure including an outermost at which carbon film is formed and the phosphorous diffused into the silicon, was manufactured. The particles of the silicon-based anode active material have sizes within the range from about 10 nm to 300 nm. The comparative sample is a silicon-based anode active material of a particle structure in which carbon films are formed on particles containing silicon and a silicon oxide, where the comparative sample is not doped with phosphorous. During the preparation of the sample, the content of each ingredient may be controlled by controlling size of silicon powder, a solvent for wet oxidation of silicon, concentration of phosphorous acid, and concentration of a carbon film precursor.

The weight ratios between the sample and the comparative samples are obtained by mixing a sample and a comparative sample, a conductive material, and a binder to prepare an anode slurry, coating the same on the current collector to produce a anode, and manufacturing a half coin-cell using lithium metal as a counter electrode. The capacity and the initial efficiency of the coin cell were evaluated under the condition of 0.1 C charging and 0.1 C discharging. After manufacturing an ion battery having NCM 424 ($Ni_{0.4}Co_{0.2}Mn_{0.4}$) to evaluate the life characteristics and the rate performance, the life characteristics thereof were evaluated under the condition of 0.5 C charging and 0.5 C discharging and the rate performance thereof were calculated as a percentage for the ratio of 0.5 C discharge to 5 C discharge, by measuring capacities of 0.2 C charge and 0.5 C discharge and capacities of 0.2 C charge and 5 C discharge.

Table 1 shows the contents of silicon, oxygen, phosphorus in the silicon-based anode active and the discharge capacity of the silicon-based anode active material of the samples according to an embodiment of the present invention and the samples according to the comparative example (comparative samples). The performance evaluation was performed with respect to the initial discharge capacity (mAh/g), the single charge/discharge efficiency (%, referred to as the initial efficiency), the capacity retention rate (retention, %) and the rate performance (%) after 50 charges/discharges. The respective contents of phosphorus in the samples according to an embodiment of the present invention were 0.005 wt %, 0.01 wt %, 0.05 wt %, 0.1 wt %, 0.5 wt %, 1 wt %, 5 wt %, 10 wt %, and 15 wt % within the range from 0.005 wt % to 15 weight %, and the contents of oxygen were 9.8 wt %, 10.0 wt %, 12.1 wt %, 18.2 wt %, 18.3 wt %, 18.4 wt %, 19.3 wt %, 19.6 wt %1, and 20.4 wt % within the range from 9 wt % to 25 wt %. Furthermore, in the samples according to an embodiment of the present invention, the contents of the carbon film with respect to the total weight of the particles and the doped phosphorus were 14.2 wt %, 14.6 wt %, 14.8 wt %, 14.9 wt %, 15.2 wt %, 15.4 wt % within the range from 4.5 wt % to 32 wht %.

TABLE 1

| Sample | Phosphorus content (wt %) | Silicon content (wt %) | Oxygen content (wt %) | Carbon content (wt %) | Discharge capacity (mAh/g) | Initial efficiency (%) | Capacity retention rate (%) | Rate performance (%, 5.0 C, 0.5 C) |
|---|---|---|---|---|---|---|---|---|
| Comparative sample 1 | 0.0 | 77.3 | 2.9 | 19.8 | 1290.0 | 86.5 | 42.1 | 46 |
| Comparative sample 2 | 0.0 | 76.5 | 9.0 | 14.5 | 1194.2 | 83.8 | 82.3 | 38 |
| Comparative sample 3 | 0.0 | 55.6 | 29.0 | 15.4 | 1138.0 | 80.4 | 85.9 | 32 |
| Comparative sample 4 | 0.005 | 73.0 | 12.1 | 14.9 | 1402.1 | 85.2 | 86.3 | 62 |
| sample 1 | 0.01 | 75.8 | 10.0 | 14.2 | 1842.2 | 87.4 | 87.2 | 67 |
| sample 2 | 0.05 | 74.8 | 9.8 | 15.4 | 2190.3 | 89.7 | 88.3 | 69 |
| sample 3 | 0.1 | 66.5 | 18.2 | 15.2 | 2152.8 | 90.4 | 91.4 | 71 |

TABLE 1-continued

| Sample | Phosphorus content (wt %) | Silicon content (wt %) | Oxygen content (wt %) | Carbon content (wt %) | Discharge capacity (mAh/g) | Initial efficiency (%) | Capacity retention rate (%) | Rate performance (%, 5.0 C, 0.5 C) |
|---|---|---|---|---|---|---|---|---|
| sample 4 | 0.5 | 66.5 | 18.4 | 14.6 | 1942.7 | 89.6 | 91.2 | 68 |
| sample 5 | 1 | 65.9 | 18.3 | 14.8 | 1893.2 | 89.6 | 92.3 | 72 |
| sample 6 | 5 | 61.1 | 19.3 | 14.6 | 1735.3 | 88.5 | 91.3 | 74 |
| sample 7 | 10 | 54.4 | 20.4 | 15.2 | 1654.8 | 86.2 | 92.3 | 73 |
| sample 8 | 15 | 50.0 | 19.6 | 15.4 | 1532.1 | 85.8 | 93.3 | 75 |
| Comparative sample 5 | 21 | 58.3 | 4.5 | 16.2 | 1401.5 | 84.2 | 52.1 | 73 |
| Comparative sample 6 | 20 | 54.5 | 10.2 | 15.3 | 1387.9 | 81.3 | 81.4 | 74 |
| Comparative sample 7 | 22 | 30.6 | 31.2 | 16.2 | 870.2 | 74.7 | 89.2 | 73 |

Figure 4:
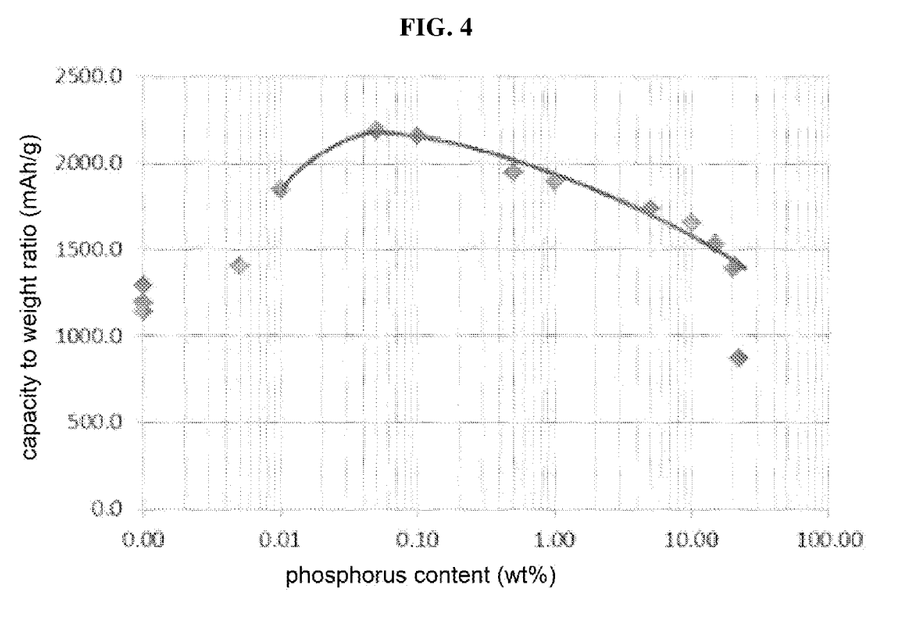
FIG. 4 is a graph showing battery capacity to weight ratio according to the phosphorus contents of the sample 1 according to an embodiment of the present invention and the comparative example.

FIG. 4 is a graph showing battery capacity to weight ratio according to the phosphorus contents of the sample 1 of Table 1 and the comparative example. The phosphorus content in the X-axis of the graph is represented by logarithmic scale.

Referring to FIG. 4, Si/C battery capacity to weight ratio which is greater than or equal to 1,500 mAh/g can be observed in samples ranging of 0.01 wt % to 15 wt % of the phosphorus contents. In case of comparative samples 1, 2, 3 without phosphorus contents and samples having low contents of phosphorus, the Si/C battery capacity to weight ratio were 1,290.0 mAh/g, 1194.2 mAh/g, 1138.0 mAh/g and 1402.1 mAh/g respectively. The Si/C weighted cost was significantly lower in the ratio to the samples. Si/C capacity to weight ratio of the comparative samples 1, 2, 3 was significantly lower than that of samples having low contents of phosphorus. Similarly, in case of comparative samples 5 (21 wt. %), 6 (20 wt. %), 7 (22 wt. %) exceeding phosphorus contents of 15 wt %, Si/C capacity to weight ratio of the comparative samples 5, 6, 7 was lower and is 1,290.0 mAh/g, 1194.2 mAh/g and 1138.0 mAh/g, respectively.

Figure 5:
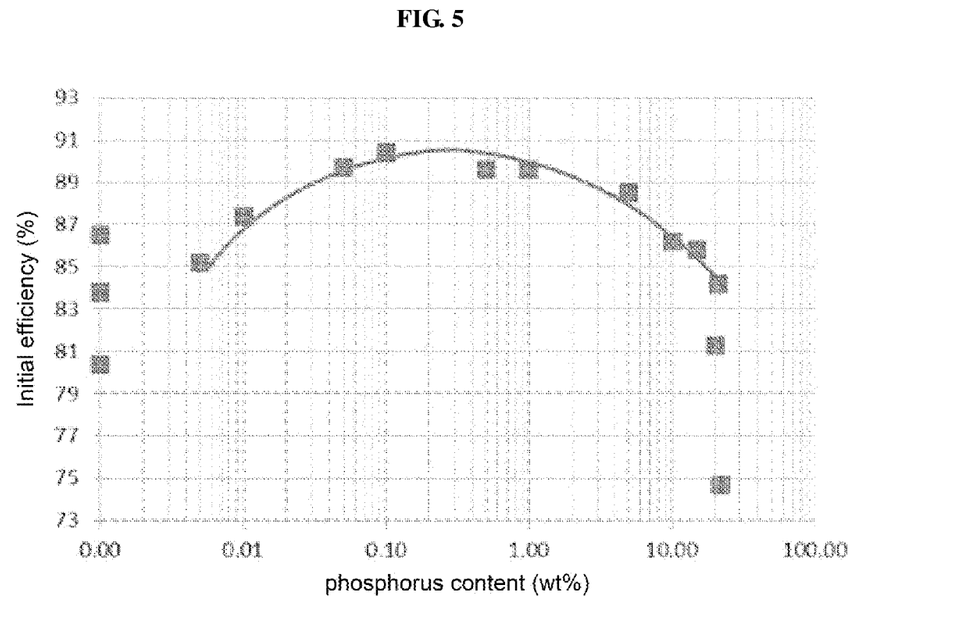
FIG. 5 is a graph showing initial efficiency according to the phosphorus contents of the sample 1 according to an embodiment of the present invention and the comparative example.

FIG. 5 is a graph showing initial efficiency according to the phosphorus contents of the sample 1 and the comparative example. The phosphorus content in the X-axis of the graph is represented by logarithmic scale.

Referring to FIG. 5, all samples in which phosphorus ranges from 0.01 wt % to 15 wt % exhibited an initial efficiency of 85.8% or more. On the other hand, it was observed that the initial efficiency of comparative samples in which phosphorus is less than 0.01 wt % or more than 15 wt % were remarkably lower, as compared with the samples. However, the comparative sample 1 showed an initial efficiency of 86.5% even though phosphorus was not contained. This is due to the reduction of the irreversible capacity due to the remarkably low oxygen contents and the capacity to weight ratio as described above, the capacity retention rate and the rate performance as described below are reduced as compared with the samples.

Figure 6:
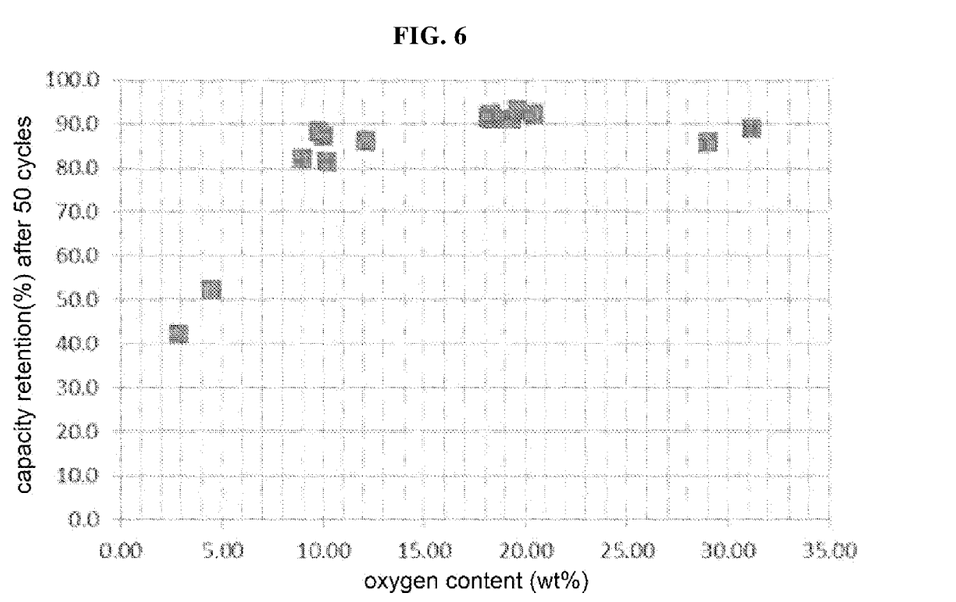
FIG. 6 is a graph showing capacity retention after 50 cycles according to the oxygen content of the sample 1 according to an embodiment of the present invention and the comparative example.
Figure 7:
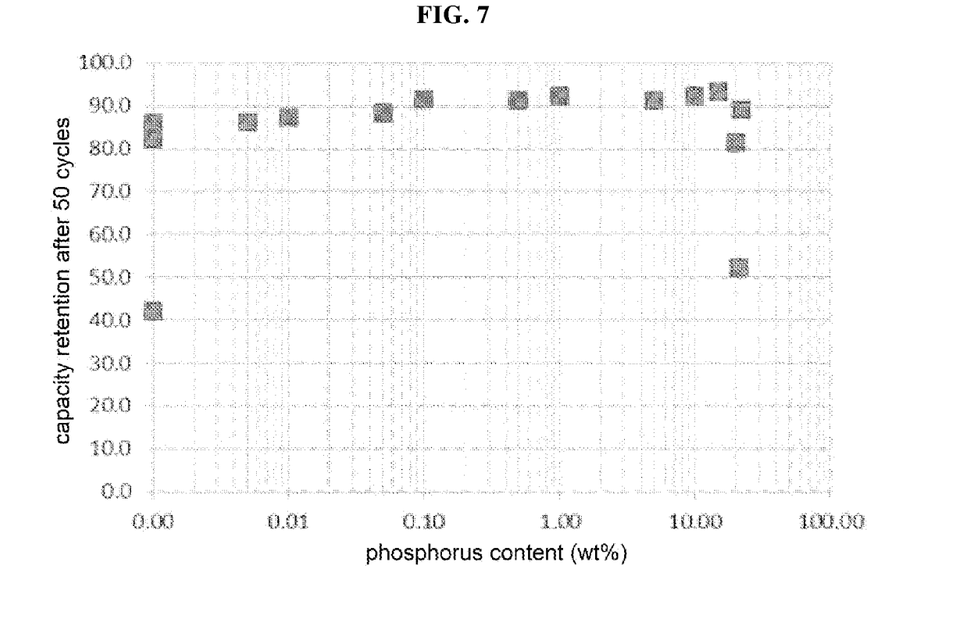
FIG. 7 is a graph showing capacity retention after 50 cycles according to the phosphorus content of the sample 1 according to an embodiment of the present invention and the comparative example.

FIG. 6 is a graph showing capacity retention after 50 cycles according to the oxygen content of the sample 1 and the comparative example and FIG. 7 is a graph showing capacity retention after 50 cycles according to the phosphorus content of the sample 1 and the comparative example. The phosphorus content in the X-axis of the graph is represented by logarithmic scale.

Referring to FIG. 6, samples in which oxygen ranges from 9.5 wt % to 25 wt % exhibit capacity retention of at least 86.3 wt %. Comparative samples 1, 2 and 5 with low oxygen content were observed to have a reduced capacity retention as compared with the samples. Comparative samples 3, 4, 6 and 7 with high oxygen content had a high capacity retention but the capacity to weight ratio and the initial efficiency were decreased as shown in the table 1.

Referring to FIG. 7, samples in which phosphorus ranges from 0.01 wt % to 15 wt % exhibit a capacity retention of at least 87.2 wt %. Comparative samples 1, 2 and 3, without the phosphorus, comparative sample 4 which has significantly low phosphorus content, and comparative samples 5, 6 and 7 which have a high phosphorus content, do not exhibit a specific tendency of the capacity retention according to phosphorus content, but samples having range from 0.01 wt % to 15 wt % of phosphorus contents exhibit a high capacity retention.

Figure 8:
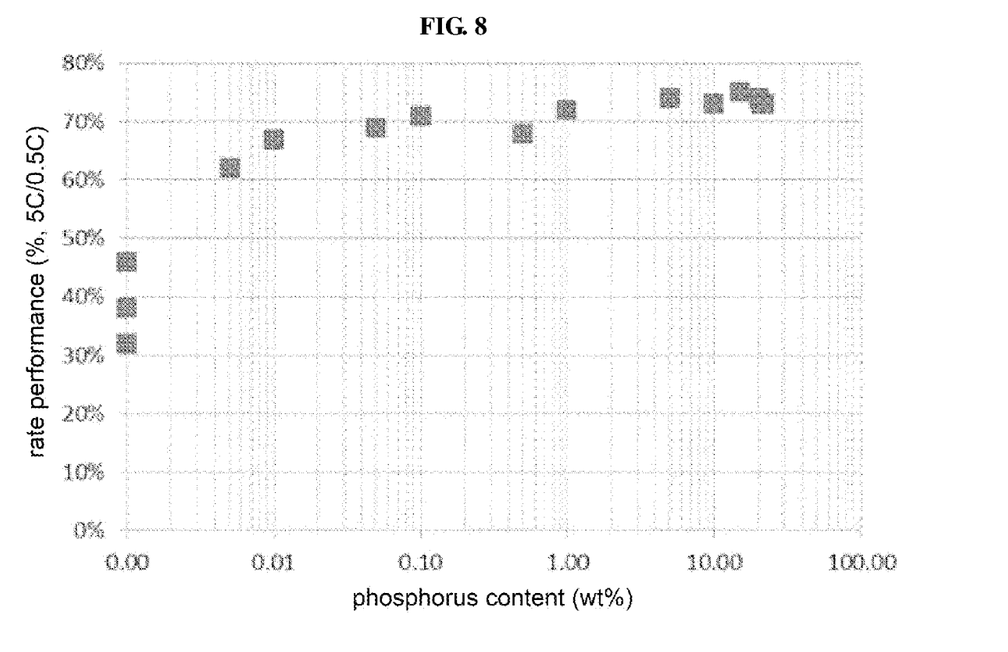
FIG. 8 is a graph showing rate performance according to the phosphorus content of the sample 1 according to an embodiment of the present invention and the comparative example Table 1.

FIG. 8 is a graph showing rate performance according to the phosphorus content of the sample 1 and the comparative example Table 1. The phosphorus content in the X-axis of the graph is represented by logarithmic scale. Referring to FIG. 8, it can be seen that samples having range from 0.01 wt % to 15 wt % of phosphorus contents showed a rate performance of at least 65% or more.

While the present invention has been described in connection with what is presently considered to be practical exemplary embodiments, it is to be understood that the invention is not limited to the disclosed embodiments, but, on the contrary, will be apparent to those of ordinary skill in the art.

INDUSTRIAL APPLICABILITY

The present invention relating to the silicon-based anode active material and the method of fabricating the same can be used for the secondary battery manufacturing technology.

The invention claimed is:
1. A silicon based anode active material comprising:
primary particles comprising silicon and oxygen combined with the silicon, wherein the primary particles comprise a core of the silicon and a shell of silicon oxide on the core of the silicon, wherein phosphorous is doped in the primary particles, wherein at least a part of the shell of the silicon oxide comprises phosphorous silicate, and wherein the primary particles have sizes within a range of from about 10 nm to 300 nm; and
secondary particles formed of aggregates of the primary particles, wherein the primary particles are electrically connected by a carbon based conductive layer on the shell of silicon oxide;
wherein a content of the phosphorus with respect to a total weight of the secondary particles and the phosphorus doped in the primary particles has a range from 0.01 wt % to 15 wt %, and a content of the oxygen with respect to a total weight of the secondary particles has a range from 9.5 wt % to 25 wt %.

2. The silicon based anode active material of claim 1, wherein the content of the phosphorus with respect to the total weight of the particles and the phosphorus doped in the primary particles have a range from 0.01 wt % to 5 wt %.

3. The silicon based anode active material of claim 1, wherein a content of the carbon-based conductive layer with respect to the total weight of the secondary particles and the phosphorus doped in the primary particles have a range from 4.5 wt % to 32 wt %.

4. The silicon-based anode active material of claim 1, wherein a thickness of the phosphorous silicate have a range from 3 nm to 15 nm.

5. The silicon based anode active material of claim 1, wherein the phosphorus is doped in the core of the silicon.

6. The silicon based anode active material of claim 1, wherein the cores of the silicon with the shells of silicon oxide are obtained by pulverizing a slurry of silicon particles in a liquid solvent containing oxygen to cause chemical oxidation of the silicon particles.

\* \* \* \* \*